United States Patent [19]

Saitoh et al.

[11] 4,119,533

[45] Oct. 10, 1978

[54] METHOD FOR SEPARATING MIXED PLASTICS

[75] Inventors: Kozo Saitoh, Tokyo; Sumio Izumi, Sayama, both of Japan

[73] Assignee: Mitsui Mining & Smelting Co., Ltd., Tokyo, Japan

[21] Appl. No.: 603,201

[22] Filed: Aug. 8, 1975

[30] Foreign Application Priority Data

Aug. 9, 1974 [JP] Japan ................... 49-91319

[51] Int. Cl.² .......................... B03B 3/02; B03B 5/62
[52] U.S. Cl. ..................... 209/155; 209/162
[58] Field of Search ............... 207/166, 172.5, 172, 207/173, 1, 3; 209/155, 162

[56] References Cited

U.S. PATENT DOCUMENTS

| 2,606,660 | 8/1952 | Klepetko | 209/173 X |
| 2,624,698 | 1/1953 | Nickey | 209/173 X |
| 2,711,822 | 6/1955 | Novak | 209/173 X |
| 3,362,531 | 1/1968 | Johnson | 209/173 X |
| 3,925,200 | 12/1975 | Izumi | 209/166 X |
| 3,926,790 | 12/1975 | Izumi | 207/166 X |
| 3,926,791 | 12/1975 | Izumi | 209/166 X |
| 3,985,650 | 10/1976 | Saitoh et al. | 210/44 |

FOREIGN PATENT DOCUMENTS 2,107,268 8/1972 Fed. Rep. of Germany ........ 209/172.5

*Primary Examiner*—Frank Sever
*Attorney, Agent, or Firm*—Sughrue, Rothwell, Mion, Zinn and Macpeak

[57] ABSTRACT

A method of separating highly hydrophobic plastics from a plastics mixture comprising placing the plastics mixture in an aqueous liquid medium, keeping the aqueous liquid medium in an agitated state to disperse the plastics mixture whereby the plastics having a higher hydrophobicity float on the aqueous liquid medium surface, and removing the plastics floating on the surface of the aqueous liquid medium.

7 Claims, No Drawings

METHOD FOR SEPARATING MIXED PLASTICS

BACKGROUND OF THE INVENTION

1. Field of the Invention

This invention relates to a method for separating highly hydrophobic plastics from a plastics mixture.

2. Description of the Prior Art

Plastic wastes have continuously been increasing in quantity in recent years, but because no effective recovery method is available, most of the waste plastics have been disposed of by landfilling or incineration. If a mixture of plastics (hereinafter plastics mixture) could be separated efficiently, the waste plastics can be reused. However, since plastics have similar specific gravities and other physical properties, it has been virtually impossible to separate a plastics mixture into the individual types of plastics.

SUMMARY OF THE INVENTION

An object of this invention is to provide a method for efficiently separating plastics having higher hydrophobicity from a plastics mixture.

The surface hydrophobicity of various plastics has been examined by measuring the contact angle of the plastics with an aqueous liquid medium such as water and it has now been found that a considerable difference in the degree of hydrophobicity among plastics exists. For example, with water, polypropylene has a contact angle of about 96°; polyethylene, about 90°; polystyrene, about 86°; polyvinyl chloride, about 82°; polyester, about 66°; cellulose triacetate, about 53°; and ebonite, about 43°. These contact angle values are measured as a flat plate of plastics. When the plastic has an irregular surface, the contact angle, of course, greatly varies. When plastics having different contact angles are mixed, and dispersed in a flowing aqueous liquid medium, those plastics having higher hydrophobicity proceed to float on the surface of the aqueous liquid medium because of the surface tension of the aqueous liquid medium, and those having low hydrophobicity are drawn into the aqueous liquid medium due to the flow of the aqueous liquid medium and remain within the aqueous liquid medium in the vessel. This discovery has led to the accomplishment of this invention.

According to this invention, there is provided a method for treating a plastics mixture, which comprises placing the plastics mixture in an aqueous liquid medium, keeping the aqueous liquid medium in an agitated state to disperse the plastics mixture whereby the plastics having a higher hydrophobicity float on the aqueous liquid medium surface, and removing the plastics floating on the surface of the aqueous liquid medium.

DETAILED DESCRIPTION OF THE INVENTION

The term "plastics" as used herein generically denote polymeric compounds which are produced by polymerization and can be molded by heat or pressure or by both. Examples include, for example, homopolymers, copolymers, laminates of different kinds of plastics, rubbers, ebonite, and cellophane. Suitable examples of plastics which can be used include thermoplastic plastics such as polyolefin plastics, polystyrene plastics, polyvinyl chloride, methacrylic resins and the like, and thermosetting plastics such as phenolic resins, melamine resins, urea resins and the like.

The functional characteristic of the present invention lies in that the plastics mixture can be separated using a difference in the degree of hydrophobicity of the plastics to the aqueous liquid medium, which is quite different from conventional techniques comprising separating the plastics using a difference in the specific gravity of the plastics. Accordingly, in the process of the present invention, the the plastics mixture comprising the components having the same or similar specific gravity to each other can also be effectively separated.

The contact angles are measured as to a sample of the plastics having a flat surface, e.g., a plate or film. In practice, the plastics to be floated and separated according to the present invention have an irregular surface. Accordingly, even when the same kind of plastics is employed, the contact angle varies depending upon roughness of the surface, irregularity, curvature and the like. However, when the difference in the contact angle is more than about 4°, preferably more than 8°, most preferably more than 10°, a separation of the plastics can be achieved.

Plastics differ in chemical composition, plasticizers incorporated in the plastics, degree of polymerization, crystallinity, surface structure, etc., and these differences are considered to affect the hydrophobicity of the surfaces of the plastics. That is, it is assumed that the chemical composition, plasticizers, degree of polymerization, crystallinity, surface structure and the like give rise the changes in electrochemical properties of the plastics surface, particularly the electrochemical double layer of the solid-solution interface, whereby a difference in the hydrophobicity of the plastics occurs.

In the present invention, these plastics can be in any form, such as a powder, peices of a film, or granules. When great quantities of such plastics are to be treated, they preferably have a size of about 1 to 10 mm.

When plastics having surface hydrophobicities which are close to each other are to be treated by the method of this invention, the addition of a wetting agent brings about good separating effects. For example, a ligninsulfonic acid salt, saponin, glue, gelatin, quebracho extract or tannic acid can be added as the wetting agent in an amount of about 1 to 500 g per ton of the starting mixture, and then, the mixture is treated by the method of this invention. Suitable examples of ligninsulfonic acid salts which can be used include an alkali metal or alkaline earth metal salt of ligninsulfonic acid such as sodium ligninsulfonate, potassium ligninsulfonate, calcium ligninsulfonate, magnesium ligninsulfonate and the like. These wetting agents are especially effective for separating polyolefin plastics from polystyrene plastics, and polyolefin plastics from each other.

Usually, water is used as the aqueous liquid medium in the method of this invention, but sea water, brine, bittern-containing water, and water containing other salts such as halides, e.g., $NaCl$, $MgCl_2$ and $MgBr_2$, etc., sulfates, e.g., $MgSO_4$, $CaSO_4$, $K_2SO_4$ and $Na_2SO_4$, etc., and bicarbonates, e.g., $Ca(HCO_3)_2$ and $NaHCO_3$, etc., can also be used. A suitable temperature of the aqueous liquid medium used in this invention is about room temperature (e.g., about 20°–30° C.), but the aqueous liquid medium can be warmed, if desired. In the present specification, the term "aqueous liquid medium" is used to describe the above listed materials and equivalents thereto and at times herein these materials will be referred to by the term "aqueous liquid medium" or the term "water" for simplicity.

It is necessary that the aqueous liquid medium in the vessel be kept flowing during the performance of the method of this invention. The type of flow may be a rotary flow, a rising flow, a descending flow, a swirling flow, or combinations of these types of flows. In order to provide such flows, the aqueous liquid medium can be stirred with rotating blades, or introduced under pressure into the vessel using a pump or a head tank, for example. The separating vessel used can be of any type generally employed such as a cylindrical-, polygonal-, trough-, cyclone-, conical-, or thickener-type. As one embodiment of the present invention, a flotation-separation vessel having a size of 600 × 600 × 900 mm in width, length and depth is employed. At the center portion of this vessel, a vertical rotating shaft is located, to which four vanes having a diameter of 135 mm are connected positioned near the bottom of the vessel. These vanes can be rotated at a rate of 400 RPM.

A suitable proportion of the starting plastics mixture to the aqueous liquid medium is about 1 to 10 parts by weight of the plastics mixture per 100 parts by weight of the aqueous liquid medium.

The plastics having a higher hydrophobicity which have floated onto the surface of the aqueous liquid medium are removed from the vessel and thus separated from the residue remaining in the vessel.

The time required for floating varies depending upon the kind of starting materials employed, and generally ranges from about 2 to 10 minutes.

The plastics floated on the surface of the aqueous liquid medium can be removed by scraping them out using, e.g., a reciprocating or rotating scraper.

Further, a preferred pH of the system ranges from about 5 to 10.

The method of this invention, as described hereinabove, comprises dispersing a plastics mixture in a flowing aqueous liquid medium to float the plastics having a higher hydrophobicity onto the surface of the aqueous liquid medium and thus separate these plastics from the other plastics. The operation is simple and inexpensive. The treatment in accordance with the method of this invention can be performed continuously, and plastics mixtures which have heretofore been discarded because there has been no feasible sorting method available can be re-used after processing by the method of this invention. The invention therefore has a great utilitarian value in conservation of resources.

The following Examples are given to illustrate the present invention more specifically. Unless otherwise indicated herein, all parts, percents, ratios and the like are by weight.

EXAMPLE 1

200 g of a mixture of 50 parts by weight of granular polystyrene and 50 parts by weight of ebonite, with the particle size of each being less than about 3 mm, was fed into a cylindrical separating vessel containing 8,000 ml of water.

A vertical rotating shaft was located at the center of the separating vessel, and stirring vanes were positioned on the shaft near the bottom. The water in the vessel was kept flowing by slowly rotating the shaft.

The polystyrene was floated onto the surface of the water because of the surface tension of water ascribable to its hydrophobicity, and was removed from the vessel. The ebonite flowed and was dispersed in the water and reached the water surface. However, since the ebonite had a lower hydrophobicity than the polystyrene, the ebonite was drawn into the water. In this example, the mixture could be separated into 98 g of a floated material containing the polystyrene in a purity of 98.4% and 102 g of a residue containing the ebonite in a purity of 96.5%.

The polystyrene and the ebonite were colored differently so that the precision of separation could be evaluated visually.

EXAMPLE 2

100 g of a mixture of 49 parts by weight of polypropylene in the form of hollow filaments and 51 parts by weight of polystyrene, with the size of each being less than 10 mm, was fed into the same type of separating vessel as described in Example 1.

As a result, polypropylene was floated onto the water surface, and the mixture could be separated into 49 g of a floated material containing polypropylene in a purity of 99.0%, and 51 g of a residue containing polystyrene in a purity of 98.9%.

The above procedure was repeated except that quebracho extract was added to the starting plastics mixture in an amount of 40 g per ton of the plastics mixture. This resulted in an increased precision of separation. The polypropylene purity of the floated material increased to 99.8%, and the polypropylene could be separated and recovered in a substantially pure form.

The purity of the separated material was determined by determining a toluene-soluble portion of the material, as polystyrene, and the insoluble residue, as polypropylene.

When a mixture of polypropylene and an ABS resin was treated in the same way as above, the polypropylene floated onto the water surface, and much the same results as described above were obtained.

EXAMPLE 3

200 g of a mixture of 50 parts by weight of irregularly-shaped polyethylene and 50 parts by weight of polyvinyl chloride, with the size of each being less than 3 mm, was fed into a separating vessel of the same type as described in Example 1.

As a result, the polyethylene floated onto the water surface, and the mixture was separated into 98 g of a floated material containing polyethylene in a purity of 98.8% and 102 g of a residue containing polyvinyl chloride in a purity of 97.3%.

When the above procedure was repeated except that sodium ligninsulfonate was added to the starting plastics mixture in an amount of 30 g per ton of the starting plastics mixture, the precision of separation further increased, and the polyethylene purity of the floated material increased to 99.6%.

The polyethylene and the polyvinyl chloride were colored differently so that the precision of separation could be evaluated visually.

EXAMPLE 4

200 g of a mixture of 30 parts by weight of granular polypropylene, 30 parts by weight of polyethylene and 40 parts by weight of polyvinyl chloride, with the particle size of each being about 1 to 3 mm, was fed into a separating vessel as described in Example 1.

As a result, 118 g of the mixture of polypropylene and polyethylene was floated onto the water surface, and 82 g of polyvinyl chloride having a purity of 98.4% was obtained as a residue.

The above procedure was repeated except that tannic acid was added to the floated mixture in an amount of 50 g per ton of the floated mixture. As a result, 58 g of polypropylene having a purity of 98.2% was floated and 60 g of polyethylene having a purity of 98.2% was separated as a residue.

While the invention has been described in detail and with reference to specific embodiments thereof, it will be apparent to one skilled in the art that various changes and modifications can be made therein without departing from the spirit and scope thereof.

What is claimed is:

1. A method of separating highly hydrophobic plastics selected from the group consisting of thermoplastics plastics, thermosetting plastics and mixtures thereof in a plastics mixture consisting of placing the plastics mixture in an aqueous liquid medium in a vessel, agitating the aqueous liquid medium by keeping the liquid medium in a rotary, rising, descending or swirling flowing state or a combination of said flowing states by stirring the medium with rotating blades or by introducing the medium under pressure into the vessel to disperse the plastics mixture whereby the plastics having a higher hydrophobicity float on the aqueous liquid medium surface, and removing the plastics floating on the surface of the aqueous liquid medium, said agitation being conducted without significant introduction of gases into said medium.

2. The method of claim 1, wherein the amount of said plastics mixture is about 1 to 10 parts by weight per 100 parts by weight of the aqueous liquid medium.

3. The method of claim 1, wherein said aqueous liquid medium is water.

4. The method of claim 1, wherein said aqueous liquid medium is sea water, brine, bittern-containing water or water containing other salts.

5. The method of claim 1, wherein the aqueous liquid medium is kept flowing by blades on a vertical rotating shaft rotated at a rate on the order of 400 RPM.

6. The method of claim 1, wherein the thermoplastic plastics are selected from the group consisting of polyolefin plastics, polystyrene plastics, polyvinyl chloride, methacrylic resins and a mixture thereof.

7. The method of claim 1, wherein the thermosetting plastics are selected from the group consisting of phenolic resins, melamine resins, urea resins and a mixture thereof.

* * * * *